United States Patent [19]
Jirmanus et al.

[11] 3,897,197
[45] July 29, 1975

[54] NEW TRANSPARENT LOW THERMAL CONDUCTIVITY GLASS COMPOSITIONS AND LAMP ENVELOPES MADE THEREFROM

[75] Inventors: Naila Saba Jirmanus, Somerville, Mass.; Guy E. Rindone, State College, Pa.; Andre C. Bouchard, Peabody, Mass.

[73] Assignee: GTE Sylvania Incorporated, Danvers, Mass.

[22] Filed: July 10, 1974

[21] Appl. No.: 487,076

[52] U.S. Cl. ................................ 431/95; 106/47
[51] Int. Cl.² ................................... F21K 5/02
[58] Field of Search ................ 431/93–95; 106/47 R

[56] References Cited
UNITED STATES PATENTS

| | | | |
|---|---|---|---|
| 3,506,385 | 4/1970 | Weber et al. | 431/95 |
| 3,607,789 | 9/1971 | Murthy et al. | 106/47 R |
| 3,771,941 | 11/1973 | Audesse et al. | 431/93 |
| 3,829,303 | 8/1974 | Lincroft et al. | 106/47 R |

Primary Examiner—Carroll B. Dority, Jr.
Attorney, Agent, or Firm—Edward J. Coleman

[57] ABSTRACT

Compositions of matter in the form of glasses composed essentially of germania, lead oxide and boric acid. These glasses, which may be referred to as lead borogermanate, are colorless and transparent, and have a low thermal conductivity and low thermal diffusivity. In a particularly useful application, the lead borogermanate glass is employed in the glass envelope of a photoflash lamp in the form of a fused inner layer or coating to minimize energy losses due to the collision of molten droplets of combustible metal with the inner wall of the envelope during flashing.

12 Claims, 3 Drawing Figures

NEW TRANSPARENT LOW THERMAL CONDUCTIVITY GLASS COMPOSITIONS AND LAMP ENVELOPES MADE THEREFROM

BACKGROUND OF THE INVENTION

This invention relates to new relatively low thermal conductivity glasses and to photoflash lamp envelopes made from such glasses.

A copending application Ser. No. 487,353, filed on even date herewith and assigned to the present assignee, describes a photoflash lamp having an envelope material selected to minimize heat losses occuring during collision of molten droplets of the combustible fill material with the inner wall of the envelope during flashing. More specifically according to the copending application, the thermal diffusivity properties of the photoflash envelope, i.e., impingement surface of the droplet, have been discovered to be of significant importance in determining the extent of radiative energy that will be lost as a result of droplet-wall collisions. It was found that the lower the thermal conductivity and thermal diffusivity properties are, the lower the energy losses from the droplet will be during impingement against the inner wall of the lamp envelope. By providing at least a thin inner layer of this selected material on the interior surface of the lamp envelope it was found that photoflash brightness losses could be reduced to a marked degree, to thereby yield a significant gain in the light output of photoflash lamps. Preferably the selected material is an inorganic glass of very low thermal conductivity, e.g., less than about $20 \times 10^{-4}$ cal/cm-sec-°C at 100°C, and low thermal diffusivity, e.g., less than about $30 \times 10^{-4}$ cm$^2$/sec at 100°C, which is coated and/or fused onto the interior surface of a much thicker layer of the primary glass envelope material, typically a conventional soft glass. Alternatively, the entire glass envelope may be composed of the selected low conductivity material. Of course, it is highly desirable that the selected glass be essentially colorless and transparent so as to provide an optically clear lamp envelope (at least prior to the application of any protective plastic coating). In this manner, the efficiency of transmitting all visible light will be optimized so that a maximum of usable light output will be provided upon flashing the lamp.

The thermal conductivity of glasses ranges from about 0.0015 to about 0.0035 cal/cm-sec-°C at 100°C. The most common glass compositions have a thermal conductivity near the upper end of the range. The heavy flint glasses have a thermal conductivity near the lower end of the range, but these glasses are yellow in color. One example of a generally suitable candidate for this application is a lanthanum borate glass composition described in the above-mentioned copending application as having a thermal conductivity of about $19.1 \times 10^{-4}$ cal/cm-sec-°C and a thermal diffusivity of about $22.7 \times 10^{-4}$ cm$^2$/sec at 100°C. When employed as a thin coating on the inner surface of an otherwise conventional glass envelope of a flash lamp, this material appeared to be quite colorless and transparent. To optimize the reduction of energy losses due to droplet-wall collisions, however, it is desirable to consider glasses or other materials with even lowe thermal conductivities. One such material described in the above-mentioned copending application is a lead borate glass composition (percent by weight) of 76.2% PbO and 23.8% B$_2$O$_3$ which has been determined to have a thermal conductivity of about $15.0 \times 10^{-4}$ cal/cm-sec-°C at 100°C and a thermal diffusivity of about $16.7 \times 10^{-4}$ cm$^2$/sec at 100°C. Although found to provide an improvement in light output, the lead borate glass is not colorless and, in samples of about one-half inch thick, exhibits a nearly opaque green appearance. In coating thicknesses of less than one mil, the lead borate glass is generally transparent but exhibits a greenish cast, particularly when heated, such as by the ignited lamp.

SUMMARY OF THE INVENTION

In view of the foregoing, a principal object of this invention is to provide a family of new glass compositions which have a low thermal conductivity while at the same time providing glass which is essentially colorless and transparent.

A particular object of the invention is to provide glasses which are transparent to substantially all visible light and have a thermal conductivity of less than $19 \times 10^{-4}$ cal/cm-sec-°C at 100°C and a thermal diffusivity of less than $30 \times 10^{-4}$ cm$^2$/sec.

Another object of the invention is to provide a photoflash lamp having an improved envelope composed at least in part from such glasses for minimizing the energy losses resulting from droplet-wall collisions.

These and other objects, advantages and features are attained, in accordance with the invention by providing new glas compositions consisting essentially of the following constituents in about the ranges stated by weight: 20 to 72 % GeO$_2$; 16 to 50 % PbO; 10 to 30 % B$_2$O$_3$; and O to 20 % additive for modifying one or more of the following properties of the glass: the coefficient of thermal expansion, thermal conductivity and chemical durability. The glasses of the invention, which may be referred to as lead borogermanate glasses, are essentially colorless and transparent and have thermal conductivities of 100°C of less than about $19 \times 10^{-4}$ cal/cm-sec-°C, and typically about in the range of 15 to $17 \times 10^{-4}$ cal/cm-sec-°C. The thermal diffusivities of the glasses at 100°C are less than about $30 \times 10^{-4}$ cm$^2$/sec, and typically about in the range of 18 to $22 \times 10^{-4}$ cm$^2$/sec.

Further, in accordance with the invention, there is provided a photoflash lamp having an envelope comprised at least in part of said lead borogermanate glass. Typically, a thin inner layer of the lead borogermanate glass is fused onto the interior surface of a much thicker layer of the primary glass envelope material. By this means, there results a minimization of the heat losses occuring during the collision of molten droplets of the combustible fill material with the inner wall of the envelope during flashing, with an attendant increase in light output.

BRIEF DESCRIPTION OF THE DRAWINGS

This invention will be more fully described hereinafter in conjunction with the accompanying drawings, in which.

Figure 1:
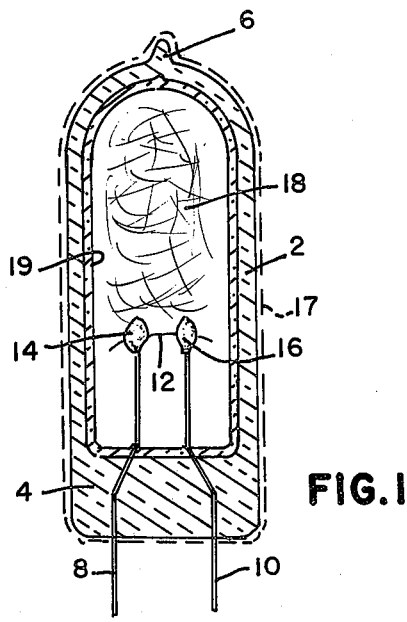
FIG. 1 is an enlarged sectional elevation of an electrically ignitable photoflash lamp having an envelope with an inner layer of a material selected in accordance with the invention.

1 and 2 showing a three-layer laminate, the outer plastic coating being omitted for clarity.

DESCRIPTION OF PREFERRED EMBODIMENT

In pursuit of the objects of this invention, we have developed a family of new glass formulations composed essentially of germania, lead oxide and boric acid. These new glasses, which may be called lead borogermanate glasses, have been found to provide the significant advantages of being essentially colorless and transparent, while at the same time exhibiting thermal conductivities of less than about $19 \times 10^{-4}$ cal/cm-sec-°C at 100°C and thermal diffusivities of less than about $30 \times 10^{-4}$ cm$^2$/sec at 100°C. Typically, the thermal conductivities appear to range from about $15 \times 17 \times 10^{-4}$ cal/cm-sec-°C; the thermal diffusivities appear to range from about 18 to $22 \times 10^{-4}$ cm$^2$/sec; and the density of the lead borogermanate glasses appears to range from about 3.5 to 4.5 g/cc.

Examples of some of our lead borogermanate glass compositions, along with some of the properties of the glasses, are presented in the table below.

durability without substantially altering thermal conductivity, and one or more of the alkali oxides, such as $Na_2O$, $K_2O$ and $Li_2O$, can be added to increase the coefficient of thermal expansion without substantially altering thermal conductivity. Other additives, such as $La_2O_3$, BaO, ZnO and/or $TiO_2$ may be included to provide a somewhat lower thermal conductivity. The total amount of the modifying additives may vary from 0 to 20% by weight of the glass composition, which otherwise consists of germania, lead oxide and boric acid. The proportions of $La_2O_3$, BaO and ZnO may each vary from 0 to 20% by weight, and the $TiO_2$, $SiO_2$ and alkali oxides may each vary from 0 to 10% by weight, with the total amount of additives not exceeding about 20%.

We now turn to a particularly useful application of the above-described lead borogermanate glasses which comprises another aspect of the present invention and represents an improvement upon the aforementioned copending application Ser. No. 487,353. Whereas the copending application describes the discovery that the light output of a photoflash lamp can be significantly improved by employing an envelope material which is

| Identifying Number | Sy-17 | Sy-18 | Sy-19 | Sy-20 | Sy-21 | Sy-22 | Sy-23 | Sy-24 |
|---|---|---|---|---|---|---|---|---|
| Composition (percent by weight): | | | | | | | | |
| $GeO_2$ | 72 | 64 | 54 | 48 | 44 | 34 | 34 | 20 |
| PbO | 18 | 16 | 36 | 32 | 36 | 36 | 36 | 50 |
| $B_2O_3$ | 10 | 20 | 10 | 20 | 20 | 30 | 30 | 30 |
| Thermal Conductivity ($10^{-4}$cal/cm-sec-°C) | | | | | | | | |
| at 100°C | 17.0 | 15.3 | 16.1 | 15.5 | 15.6 | 15.6 | 15.6 | 16.1 |
| at 200°C | 18.7 | 16.6 | 17.4 | 17.0 | 17.0 | 17.2 | 17.2 | 17.7 |
| at 300°C | 20.2 | 18.3 | 19.1 | 18.6 | 18.4 | 18.9 | 18.9 | 19.7 |
| Density (g/cc) | 3.9 | 3.5 | 4.5 | 4.0 | 4.2 | 4.0 | 4.0 | 4.2 |
| Thermal Diffusivity ($10^{-4}$cm$^2$/sec) at 100°C | 21.8 | 21.9 | 17.9 | 19.4 | 18.6 | 19.5 | 19.5 | 19.2 |

The thermal diffusivity of the glass is a property which may be calculated using the formula $$D = \frac{K}{c\rho}$$

where $K$ is the thermal conductivity of the glass; $c$ is the specific heat (approximately 0.2 cal/gm-°C); and $\rho$ is the density of the glass.

In a typical example of the preparation of glasses of the invention, the following batch materials were melted at a temperature of about 1,200°C in a Kyanite crucible in air atmosphere. All samples were very fluid at this temperature. The batches are shown below in parts by weight for the denoted glasses of the above table:

| Identifying No. | Sy-18 | Sy-24 |
|---|---|---|
| Batch Material: | | |
| $GeO_2$ | 96.0 grams | 30.0 grams |
| $Pb_3O_4$ | 24.6 grams | 76.8 grams |
| $H_3BO_3$ | 53.4 grams | 80.1 grams |

One or more properties of the above-described lead borogermanate glasses can be modified by further including selected additives in the compositions. For example, $SiO_2$ may be included for improving chemical selected to minimize heat losses occuring during droplet-wall collisions, we have found that our lead borogermanate glass is uniquely suited to application as said selected envelope material in view of the essentially colorless transparency of the lead borogermanate glass and its very low thermal conductivity and thermal diffusivity properties.

Accordingly, it is an aspect of the present invention to provide a significantly improved photoflash lamp by either forming the entire glass envelope of a lead borogermanate glass or, more preferably, by employing the lead borogermanate glass as an inner layer or coating fused to the interior surface of a much thicker primary glass envelope material. The teachings of this aspect of the invention are applicable to either percussive or electrically ignited photoflash lamps of a wide variety of sizes and shapes; however, the invention is particularly advantageous as applied to flashlamps having tubular shaped envelopes with a volume of less than one cubic centimeter. For purposes of example, the invention will be described as applied to the electrically ignitable photoflash lamps illustrated in FIG. 1.

Referring to FIG. 1, the lamp comprises an hermetically sealed lamp envelope including a primary layer of glass tubing 2 having a press 4 defining one end thereof and an exhaust tip 6 defining the other end thereof. Supported by the press 4 is an ignition means comprising a pair of lead-in wires 8 and 10 extending through and sealed into the press. A filament 12 spans the inner ends of the lead-in wires, and beads of primer 14 and 16 are located on the inner ends of the lead-in wires 8 and 10, respectively, at their junction with the filament. Typically, the lamp envelope has an internal diameter of less than one-half inch, and an internal volume of less than 1 cc., although the present invention is equally suitable for application to larger lamp sizes. The exterior surfaces of the glass envelope is covered with a protective coating 17 (denoted by dashed lines) such as cellulose acetate lacquer or a vacuum-formed thermoplastic coating, such as described in U.S. Pat. No. 3,770,366. A combustion-supporting gas, such as oxygen, and a filamentary combustible metal 18, such as shredded zirconium or hafnium foil, are disposed within the lamp envelope. Typically, the combustion-supporting gas fill is at a pressure exceeding about 500 centimeters of mercury, and the lamp is loaded with about 15 milligrams or more of the filamentary combustible metal. In accordance with the invention, the lamp envelope also includes an inner layer or a lead borogermanate glass 19 which is coated and/or fused onto the inner surface of the primary layer of glass 2.

A percussive type photoflash lamp is described in several prior patents of the present assignee; for example U.S. Pat. No. 3,674,411. As described therein, the percussive lamp also includes a sealed glass envelope containing a filamentary combustible material and a combustion-supporting gas; however, the ignition means comprises a metal primer tube sealed in and depending from one end of the glass envelope and containing a coaxially disposed wire anvil partially coated with a charge of fulminating material. A deflector-shield is located on the wire anvil just above the inner mouth of the primer tube.

Although somewhat different in structure and operation, the electrical and percussive lamps are similar in that in each the ignition means is attached to one end of the lamp envelope and disposed in operative relationship with respect to the filamentary combustible material. More specifically, the igniter filament 12 of the flash lamp in FIG. 1 is incandesced electrically by current passing through the metal filament support leads 8 and 10, whereupon the incandesced filament ignites the beads of primer 14 and 16 which in turn ignite the combustible 18 disposed within the lamp envelope. Operation of the percussive-type lamp is initiated by an impact onto the primer tube to cause deflagration of the fulminating material up through the tube to ignite the combustible disposed within the lamp envelope.

Ignition of the filamentary combustible metal 18 produces an array of burning droplets of metal and metal oxide which impinge against the envelope walls. The typical droplet radius is from 50–100 microns. As described in the copending application, a study of the kinetics of combustion involved in the collision of such droplets with a variety of wall materials led to the discovery that the composition of the inner surface of the envelope wall determined to a significant extent the radiating life time of the burning droplet subsequent to collision. For example, droplets were essentially extinguished when striking a sapphire surface, while the radiative energy of droplets colliding with a mica surface was insignificantly affected. More interestingly, a close correlation was found to exist between the thermal conductivity of the impingement surface and the droplet energy losses during collision. Thermal diffusivity was also found to be a significant contributing factor. Accordingly, it was determined that the radiative energy losses resulting from droplets colliding with the envelope walls of an ignited photoflash lamp could be significantly minimized by selecting an envelope material which minimized the conductive heat losses occuring during droplet-wall collisions. In particular, envelope materials having a low thermal conductivity, that is, less than about $24 \times 10^{-4}$ cal/cm-sec-°C at 100°C, and/or a low thermal diffusivity, that is, less than about $50 \times 10^{-4}$ cm²/sec at 100°C, were found especially suitable for this purpose. Preferably, according to the teachings of the copending application, the selected material should be inorganic and have a thermal conductivity which is less than about $20 \times 10^{-4}$ cal/cm-sec-°C at 100°C and a thermal diffusivity of less than about $30 \times 20^{-4}$ cm²/sec at 100°C. According to the present invention, we have found the lead borogermanate glasses described hereinbefore to be eminently and uniquely suited for application as the selected material 19.

The minimum thickness of layer 19 for providing an effective barrier to thermal losses into the envelope wall upon collision by a burning droplet of metal for a fraction of a millisecond may be calculated by approximated means considering the duration of droplet wall contact and the thermal conductivity, density and heat capacity of the impinged envelope material. For example, for a set of typical subminiature flashlamp parameters and an assumed collision duration of about 0.1 millisecond, a minimum layer thickness of about 10 microns has been determined. In general, however, the thickness of inner layer 19 will range from one to three mils, with the primary layer 2 of glass being several times thicker than the inner layer 19 (e.g., of the order of 24 mils) as illustrated by the greatly enlarged wall cross-section of FIG. 2. Typically, primary layer 2 is a soft glass of the type conventionally used for flashlamp envelopes; hence, the conductivity and/or thermal diffusivity of the inner layer 19 of lead borogermanate glass are less than the thermal conductivity and/or thermal diffusivity of the primary layer material 2.

In applying the lead borogermanate glasses as coatings, the fusion temperature should be compatiable with that of the substrate, viz., the primary layer 2, which may be either a soft glass or a hard glass. The fusion temperatures of the lead borogermanate glass compositions listed in the table hereinbefore and identified as Nos. Sy-17 through Sy-24 range between about 600° to 800°C. The value can be lowered, however, to be more compatible with soft glasses, such as Corning Type 0010, by increasing the concentration of PbO and $B_2O_3$, or by adding an alkali oxide, with very little change in the thermal conductivity.

Generally, the mean coefficient of thermal expansion of the inner layer 19 will be matched to the mean coefficient of thermal expansion of the primary layer 2. The coefficients of thermal expansion of the lead borogermanate glass compositions listed in the above-mentioned table range between about 55 to $70 \times 10^{-7}$ in./in./°C between 0° and 300°C, and this can be increased to about $95 \times 10^{-7}$ in./in./°C by the addition of alkali oxides, as previously discussed. Thus, if the primary layer glass is Corning Type 0010, which has a coefficient of thermal expansion of about $93 \times 10^{-7}$ in.-/in./°C between 0° and 300°C, and an expansion match is desired with inner layer 19, the alkali-modified lead borogermanate glass may be employed. On the other hand, it is often desired that the thin layer 19 have a lower coefficient of thermal expansion than primary layer 2, whereby layer 19 will be in a state of compression to provide added strength. In such a case, one of the unmodified lead borogermanate glasses listed in the table would provide a suitable material for the inner layer 19. It may also be noted that the coefficient of thermal expansion of the lead borogermanate glass can be decreased by increasing the glass former $B_2O_3$.

One method of applying the lead borogermanate glass as an inner layer 19, would be to grind the glass to a 100 to 200 mesh particle size and suspend this glass powder in an organic binder system, such as ethyl cellulose lacquer. The suspension could then be coated on the inner surface of the primary glass sleeve, after which the coating would be dried and flame fused to the primary glass layer 2.

Figure 2:
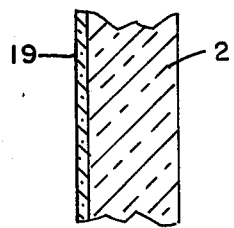
FIG. 2 is a greatly enlarged detail cross-section of a portion of the envelope wall of the lamp of FIG. 1, with the outer plastic coating being omitted for clarity.

According to a preferred embodiment, however, in lieu of applying a coating as described above, the multi-layer envelope structure is provided by employing laminated glass sleeves having two or more layers of glass fused together. For example, the laminated glass may have a cross-section such as illustrated in FIG. 2 with a thin (e.g. 1 to 3 mils thick) layer 19 of lead borogermanate glass fused to a much thicker (e.g., 24 mils) primary layer 2 of conventional soft glass. In a typical example of a preferred embodiment, the two-layer laminated glass may be provided in the form of tubular sleeves of the size employed for making tubular flash lamp envelopes having an internal volume of approximately 0.78 cc. The ignition structure (8–16) is then press sealed into one end of the glass sleeve, and the lamp is loaded with, 30 mgs. of shredded zirconium foil comprising four inch crumpled strands having a cross-section of approximately 0.95 × 1.3 mils. Thereafter the lamp is filled with oxygen and tipped off, the initial oxygen fill pressure being about 675 cm. Hg. The resulting tubular lamp envelope will have an outside diameter of about 0.4 inch, with the primary layer 2 of, say, Corning 0080 glass having a thickness of about 35 mils and the inner layer 19 of lead borogermanate glass being about 3 mils thick. The lamp is then provided with an exterior lacquer dip coating 17 of cellulose acetate having a thickness of about 11 mils.

Another interesting approach is to combine the features of the present invention with the envelope strengthening characteristics of the lamp described in U.S. Pat. No. 3,676,043, assigned to the present assignee. According to that patent, an improved flashlamp structure is provided by employing a laminated envelope comprising three separate layers of glass fused to one another. The center layer of glass has a higher coefficient of thermal expansion than the inner and outer layers, with the result that the center layer is in tension and the other layers are under compressive stress. As a result, the envelope is stronger than conventional single layer glass envelopes and more resistant to internal pressure when the lamp is flashed.

Figure 3:
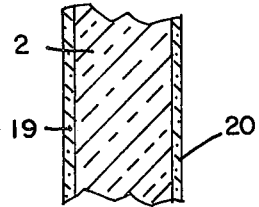
FIG. 3 is a greatly enlarged detail cross-section of an alternative embodiment of the envelope wall of FIGS.

Hence, as illustrated in FIG. 3, a flashlamp in accordance with the teachings of both the present invention and U.S. Pat. No. 3,676,043 may have a three-layer laminated glass envelope. The primary (center) layer 2 would comprise a relatively thick (e.g., 24 mils or greater) layer of higher thermal expansion glass, while the inner and outer layers 19 and 20, respectively, would be quite thin (e.g., 1 to 3 mils) and have a lower coefficient of thermal expansion than the center layer 2. For example, the center layer 2 may have a thickness of about 24 mils and comprise Corning type 0080 glass having a coefficient of thermal expansion of approximately 92 × $10^{-7}$ in./in./°C between 0° and 300°C. Inner layer 19 may be about 3 mils thick and comprise lead borogermanate glass of the composition identified in the table as No. Sy-18 and having a measured coefficient of thermal expansion of about 68 to 70 × $10^{-7}$ in./in./°C between 0° and 300°C. Finally, outer glass layer 20 may be about 3 mils thick and comprise the same glass as inner layer 19 or some other suitable glass having a coefficient of thermal expansion similar to that of inner layer 19. In this manner, the low conductivity of the inner layer will result in improved light output, and the compressive loading of the inner and outer layers will result in a stronger envelope.

Although the invention has been described with respect to specific embodiments, it will be appreciated that modifications and changes may be made by those skilled in the art without departing from the true spirit and scope of the invention. For example, in lieu of a fused layer 19, the low conductivity thermal barrier may comprise a tubular sleeve of lead borogermanate glass of low thermal conductivity and diffusivity concentrically located within the lamp envelope.

What we claim is:

1. A photoflash lamp comprising:

an hermetically sealed, light-transmitting envelope;

a quantity of combustible material located in said envelope;

a combustion-supporting gas in said envelope; and ignition means attached to said envelope and disposed in operative relationship to said combustible material;

said envelope comprising a lead borogermanate glass which is colorless and transparent and which has a thermal conductivity of less than about 19 × $10^{-4}$ cal/cm-sec-°C at 100°C, and a composition consisting essentially of the following constituents in about the ranges stated by weight: 20 to 72% $GeO_2$; 16 to 50% PbO; 10 to 30% $B_2O_3$; and 0 to 20% additive for modifying one or more of the following properties of said glass: the coefficient of thermal expansion, thermal conductivity and chemical durability.

2. The lamp of claim 1 wherein said envelope includes a primary layer of glass and an inner layer of said lead borogermanate glass located between said combustible material and said primary layer, said inner layer of lead borogermanate glass having a thermal conductivity which is less than the thermal conductivity of said primary layer glass.

3. The lamp of claim 2 wherein the inner layer of said envelope comprises a coating of said lead borogermanate glass on the inner surface of said primary layer of glass.

4. The lamp of claim 3 wherein said coating has a thickness of at least about 10 microns.

5. The lamp of claim 4 wherein said coating has a thickness of at least about 1 mil.

6. The lamp of claim 3 wherein said coating has a mean coefficient of thermal expansion which is substantially matched to or less than the mean coefficient of thermal expansion of said primary layer of glass.

7. The lamp of claim 6 wherein the glass inner layer of said envelope is fused to the inner surface of said glass primary layer.

8. The lamp of claim 2 wherein said envelope is a laminate including at least two layers of glass fused together, one of said layers being said primary layer and another of said layers being said inner layer.

9. The lamp of claim 8 wherein said inner layer has a thermal conductivity at 100°C about in the range of 15 to 17 × $10^{-4}$ cal/cm-sec-°C.

10. The lamp of claim 9 wherein said inner layer has a thermal diffusivity at 100°C about in the range of 18 to 22 × $10^{-4}$ cm$^2$/sec.

11. The lamp of claim 8 wherein the coefficient of thermal expansion of said inner layer glass is less than that of said primary layer glass.

12. The lamp of claim 8 wherein said inner layer has a thickness of from about 1 to 3 mils, and said primary layer is several times thicker than said inner layer.

* * * * *